May 2, 1967 R. F. BRAUNE 3,317,019

KEYBOARD OVERLAY TO CHANGE INDICIA INDICATED BY KEY CAP

Filed Sept. 20, 1965 2 Sheets-Sheet 1

INVENTOR.
ROBERT F. BRAUNE

BY John J. Goodwin

ATTORNEY

May 2, 1967 R. F. BRAUNE 3,317,019

KEYBOARD OVERLAY TO CHANGE INDICIA INDICATED BY KEY CAP

Filed Sept. 20, 1965 2 Sheets-Sheet 2

United States Patent Office 3,317,019
Patented May 2, 1967

3,317,019
KEYBOARD OVERLAY TO CHANGE INDICIA INDICATED BY KEY CAP
Robert F. Braune, Putnam Valley, N.Y., assignor to International Business Machines Corporation, Armonk, N.Y., a corporation of New York
Filed Sept. 20, 1965, Ser. No. 488,699
8 Claims. (Cl. 197—98)

The present invention relates to devices for changing the symbolic representations on keyboards, and more particularly to an overlay device for fitting over the keys of keyboards for changing the symbols thereon.

In many instances it is desirable to change the labeling of the keys on a keyboard device. For example, on a keyboard model computer input terminal the depression of a key results in the generation of a binary coded signal. The meaning associated with the binary coded signal of each key depends on the intent of the programmer, for example, it could be representative of a chemical symbol, a Greek letter, or a mathematical symbol depending on the use to which the computer terminal is being put. In such instances it is useful to provide the keyboard user with a graphic presentation of the particular symbol represented by each of the keys of the keyboard. Likewise, in typewriter devices it is quite common for the type faces to be changed for special purposes and therefore it would be necessary to provide the user with the changed symbols of each key associated with the type face. For example, in the I.B.M. Selectric typewriter, as shown in U.S. Patent No. 2,905,302, issued Sept. 22, 1959, to J. E. Hickerson and assigned to the present assignee, it is possible to change type symbols very quickly by replacing the spherical type element. Specialized type elements may be provided, for example, having type faces in the Greek or Cyrillic alphabet. The keyboard of the typewriter, however, has the Arabic alphabet permanently inscribed on the faces of the keys. In order to operate such specialized type elements, the operator must know which key is associated with the appropriate letter of the Greek or Cyrillic alphabet, etc., on the type element. One known method of modifying the graphic symbols on typewriter keys is to provide separate caps which fit over each key and have the new symbol inscribed thereon. Since most keyboard devices have at least forty-four keys, this is a time-consuming process and the individual key covers are subject to being mislaid. Other attempts at changing keyboard nomenclature by providing a single flexible overlay sheet having the new symbols inscribed thereon have suffered from the fact that they interfere with the typist's performance, that they cause the depression of more than one key (particularly in sensitive electric keyboard machines), and that they are difficult to maintain in the proper position.

The present invention provides an improved apparatus for changing the symbols appearing on the keys of keyboard devices.

Another object of the present invention is to provide an apparatus for changing the symbols of a keyboard device which fits compactly over each of the individual keys of the keyboard.

Still another object of the present invention is to provide an apparatus for covering the keys of a keyboard device wherein the movement or depression of any one key is isolated from the remaining keys of the keyboard.

A still further object of the present invention is a keyboard overlay device which incorporates the flexibility necessary for the operation of the keys and the rigidity necessary for keeping the overlay in registration with the keys.

The foregoing and other objects, features and advantages of the invention will be apparent from the following more particular description of preferred embodiments of the invention, as illustrated in the accompanying drawings.

Figures 1, 2:
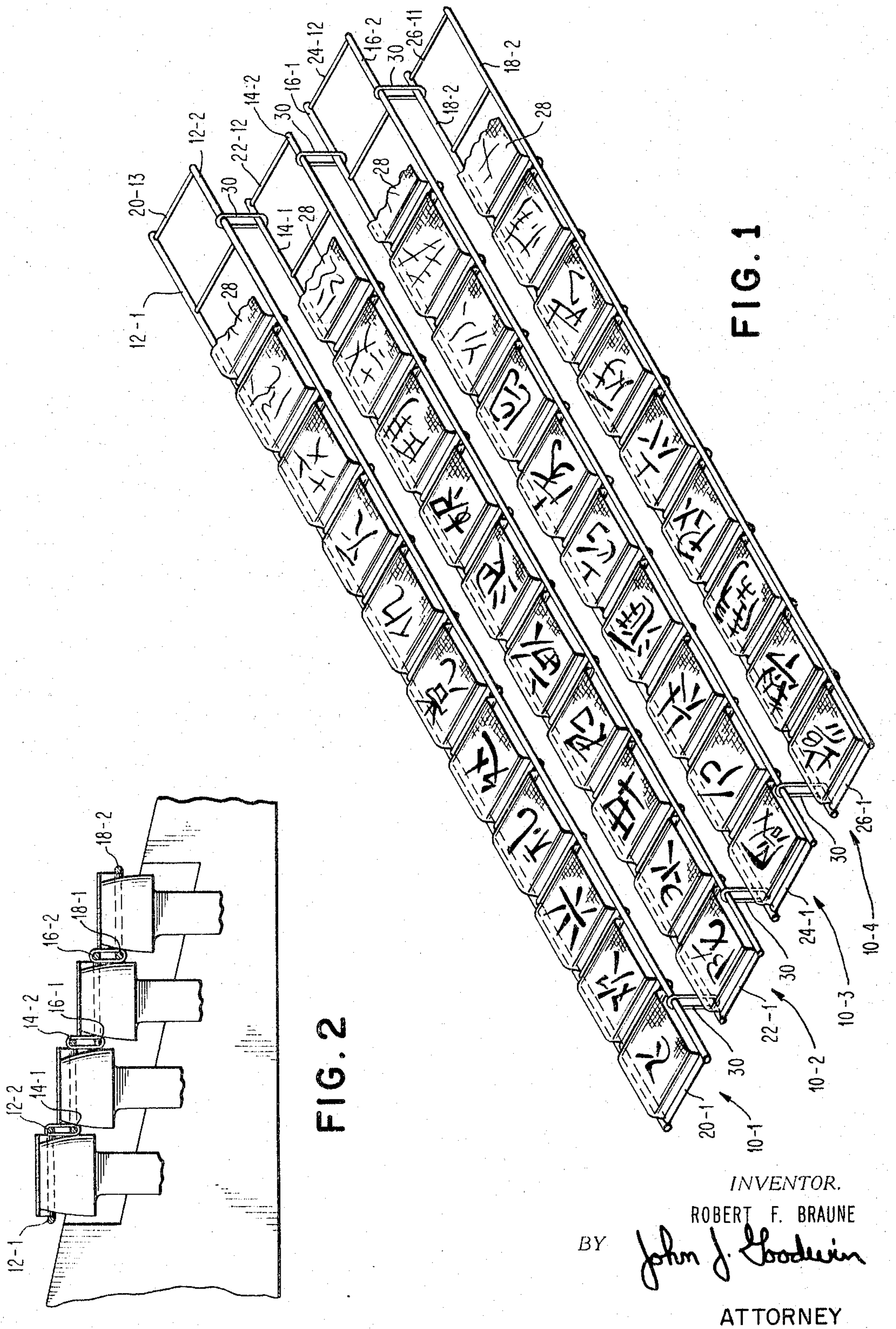
FIG. 1 shows a perspective view of an embodiment of a keyboard overlay following the principles of the present invention wherein the individual rows of the overlay are flexibly connected.
FIG. 2 shows a side elevation detail of the keyboard overlay of FIG. 1 as it would appear when mounted on a typical keyboard.

Referring to FIG. 1, a keyboard overlay is shown which is adapted to be employed with the conventional typewriter keyboard, that is, it consists of four rows having a total of forty-four key positions. Each row of the overlay is designed to be placed over a separate row of keys of the keyboard. Each row of the overlay consists of a frame (10–1 through 10–4) having two longitudinal elements 12–1 and 12–2, 14–1 and 14–2, 16–1 and 16–2, and 18–1 and 18–2 extending the entire length of the keyboard row. The two longitudinal elements of each of the frames are separated and connected together by a plurality of parallel members connected at right angles to the longitudinal elements to form a rigid ladder-like structure. Frame 10–1 includes members 20–1 through 20–13, frame 10–2 includes members 22–1 through 22–12, frame 10–3 includes members 24–1 through 24–12, and frame 10–4 includes members 26–1 through 26–11. The width, or distance, between each of the parallel members is slightly greater than the diameter of the key surfaces with which they are associated. A flexible member 28, such as a lightweight tape, is provided for each of the frames. The flexible member is dimensionally longer than the longitudinal elements of the frames and is connected to the end-most element members (20–1 and 20–13, 22–1 and 22–12, 24–1 and 24–12, and 26–1 and 26–11) of each of the frames. The flexible member 28 is threaded below the remaining parallel members in each of the frames. The flexible members 28 may be attached to the remaining parallel members by clamps, staples, adhesive, etc., and the surface of the flexible members 28 may be stiffened in the region near the parallel members by lacquer, etc., to additionally restrict movement.

In FIG. 1, which is a representation of the flexibly connected keyboard overlay, the adjacent longitudinal elements (12–2 and 14–1, 14–2 and 16–1, and 16–2 and 18–1) of each of the frames are connected together by at least two elliptical rings 30 for each frame to frame connection.

FIG. 2 shows the keyboard overlay of FIG. 1 placed in operating position. It is seen that the longitudinal elements 12–1 and 12–2, 14–1 and 14–2, 16–1 and 16–2, and 18–1 and 18–2 are placed on either side of the rows of keys. The parallel members 20–1 through 20–13, 22–1 through 22–12, 24–1 through 24–12, and 26–1 through 26–11 of each of the frames 10–1 through 10–4 are positioned between each of the keys of each of the rows. In effect, each of the keys of the keyboard is surrounded by a four-sided rigid portion of a frame. The flexible members 28 are therefore caused to be in contact with and cover the top surfaces of each of the keys. The flexible members 28, being threaded below each of the parallel members, provide a support for the frames and prevent the frames from descending completely over the keys.

Referring again to FIG. 1, it is seen that the flexible members 28, when placed in position as shown in FIG. 2, will cover the top surfaces of the individual keys. The flexible members 28 are inscribed with symbols which are related to the type element being employed. For example, in FIG. 1, it is presumed that a type element composed of Chinese characters is being used, or, in the case of a computer terminal, the code signal generated by the key represents the Chinese character. Thus, the operator in viewing the keyboard overlay will know which key to depress to produce the desired Chinese character.

The flexible members 28 adhere to the parallel members 12–1 through 12–13, 14–1 through 14–12, 16–1 through 16–12, and 18–1 through 18–11 at their points of contact so that when any individual key is depressed, the portion of the flexible member covering that key will be depressed by the typist and the movement of the portion of the flexible member 28 covering the desired key will be isolated from the portions of the flexible member 28 covering adjacent keys. The frames 10–1 through 10–4 will be supported by the flexible members threaded over the surfaces of the keys and will "float" in the area surrounding the keys. The frames 10–1 through 10–4 provide isolation between the areas of the flexible members 28 covering each of the key surfaces and the frames 10–1 through 10–4 are also located far enough over the keys so that they provide registration and the keyboard overlay as a whole remains in place during the typing operation, that is, it will not slip, fall, or otherwise move with respect to the keyboard.

Figure 3:
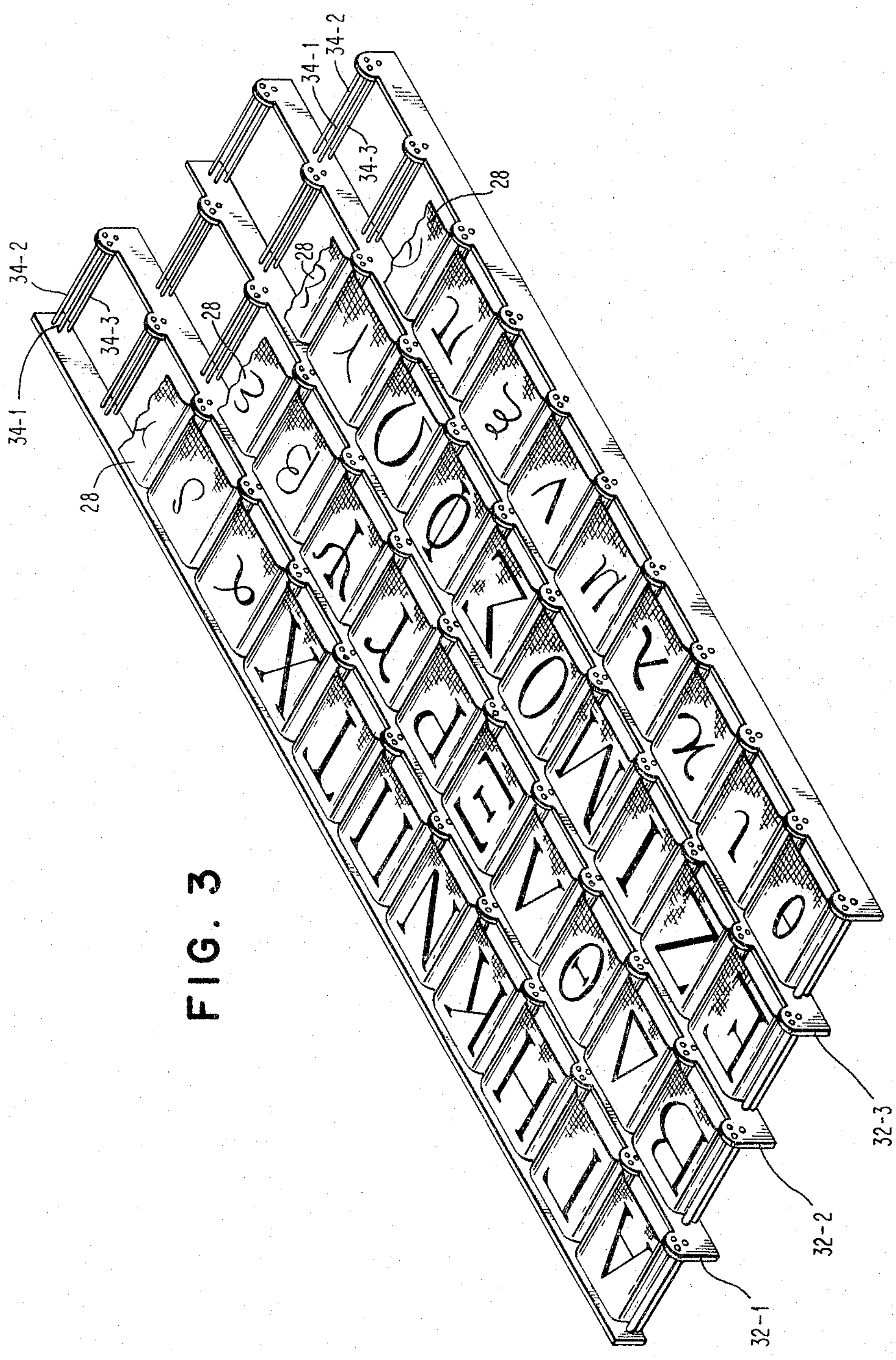
FIG. 3 shows a perspective view of another embodiment of a keyboard overlay following the principles of the present invention wherein the rows of the overlay are rigidly connected.

Referring to FIG. 3, another embodiment of a keyboard overlay according to the present invention is shown. The keyboard overlay shown in FIG. 3 is similar to that shown in FIG. 1 with the exception that adjacent frames share a common longitudinal row, such as 32–1, 32–2 and 32–3. Also, instead of a single parallel member separating each of the key positions, a plurality (i.e., three) of parallel members are shown such that the flexible members 28 are threaded between the upper two parallel members 34–1 and 34–2 and below the lower parallel member 34–3. The flexible members 28 are permanently fixed to the parallel members at the ends of each of the frames. The keyboard overlay of FIG. 3, being rigid, the individual rows must be staggered in height in order to conform to the staggered placement of the rows of keys on a typical keyboard. For purposes of illustration, the keyboard overlay of FIG. 3 is shown having the Greek alphabet inscribed thereon.

What has been described is a keyboard overlay including a rigid frame and flexible members connected to the rigid frame. The rigid frame maintains the keyboard overlay in position with respect to the keys. The flexible members serve to provide a surface upon which new key symbols may be presented and which also supports the rigid frame over the keys. The flexible members may be depressed in order to operate the keyboard, however, the rigid frame insures that when a portion of the flexible member is depressed, the movement of the portion of the flexible member is isolated from the remainder of the flexible member. The flexible member 28 may be manufactured from thin, lightweight plastic material such that it has minimum interference with the operator of the keyboard. The frame portions may be simply manufactured by stamping them from metal or plastic stock.

The embodiments shown in FIGS. 1 and 3 depict keyboard overlays which may be employed with conventional typewriter keyboards. It is to be understood that the present invention may be employed with any type of keyboard device such as a keypunch or any specialized apparatus employing a plurality of keys which must be depressed. Therefore, the precise design of the keyboard overlay as shown in FIGS. 1 and 3 is for purposes of illustration and is not meant to be the restriction on the scope of the invention.

While the invention has been particularly shown and described with reference to preferred embodiments thereof, it will be understood by those skilled in the art that various changes in form and details may be made therein without departing from the spirit and scope of the invention.

What is claimed is:

1. A device for mounting on a keyboard containing a plurality of keys comprising:
- at least one rigid frame adapted to be placed over a separate row of keys of the keyboard, said rigid frame including first and second longitudinal members and a plurality of spaced parallel members transversely connected between said first and second longitudinal members,
- and at least one flexible member associated with said rigid frame, said flexible member extending over said associated rigid frame and connected to said parallel spaced members thereof, said flexible member covering the row of keys of the keyboard and supporting the interconnected rigid frame when said rigid frame is placed over the row of keys of the keyboard.

2. A device for mounting on a keyboard containing a plurality of keys comprising:
- a plurality of interconnected rigid frames, each of said rigid frames adapted to be placed over a separate row of keys of the keyboard, said rigid frames including first and second longitudinal members and a plurality of spaced parallel members transversely connected between said first and second longitudinal members,
- and a plurality of flexible members each associated with a separate one of said rigid frames, each of said flexible members longitudinally extending over said associated rigid frame and connected to said parallel spaced members thereof, said flexible members covering the keys of the keyboard and supporting the interconnected rigid frames when said interconnected rigid frames are placed over the keys of the keyboard.

3. A device according to claim 2 wherein said rigid frames are flexibly interconnected by rings encircling given ones of said longitudinal members.

4. A device according to claim 2 wherein said flexible members have given symbols printed thereon.

5. A device for mounting on a keyboard having a plurality of keys comprising:
- a plurality of spaced, parallel, longitudinal members,
- a plurality of spaced, parallel, transverse members connected to said longitudinal members to form a frame,
- and a plurality of flexible tapes, each flexible tape extending between a separate pair of parallel longitudinal members and connected to each of the parallel transverse members connected to said pair of longitudinal members, said flexible members covering the keys of the keyboard and supporting said longitudinal and transverse members when said frame is placed over the keys of the keyboard.

6. A device according to claim 5 wherein each of said flexible tapes are threaded past each of said parallel transverse members connected to said longitudinal members.

7. A device for mounting on a keyboard containing a plurality of keys comprising:

at least one rectangular rigid frame having a plurality of square apertures linearly disposed in the longitudinal direction of said rectangular frame, and a flexible member connected to the transverse sides of said at least one rectangular rigid frame and threaded through the apertures in said frame.

8. A device according to claim 7 including:

a plurality of said rectangular frames, each having a flexible member connected thereto, said plurality of rectangular frames being arranged longitudinally parallel, and means for connecting the rectangular frames together to form a single frame.

References Cited by the Examiner

UNITED STATES PATENTS

| | | | |
|---|---|---|---|
| 396,529 | 1/1889 | Bofinger | 197—4 |
| 527,112 | 10/1894 | Harte | 197—4 |
| 630,848 | 8/1899 | Bofinger | 197—4 |
| 662,333 | 11/1900 | Angell | 197—4 |
| 1,078,081 | 11/1913 | Baker | 197—98 X |
| 2,625,330 | 1/1953 | Buckey et al. | 197—98 X |

ROBERT E. PULFREY, *Primary Examiner.*

E. S. BURR, *Assistant Examiner.*